United States Patent [19]
Matsumoto et al.

[11] Patent Number: 5,755,500
[45] Date of Patent: May 26, 1998

[54] IMAGE READING APPARATUS

[75] Inventors: Toshiya Matsumoto, Kawasaki; Kazuhide Sugiyama, Yokohama, both of Japan

[73] Assignee: Canon Kabushiki Kaisha, Tokyo, Japan

[21] Appl. No.: 654,390

[22] Filed: May 28, 1996

[30] Foreign Application Priority Data

| May 31, 1995 | [JP] | Japan | 7-157091 |
| Jan. 9, 1996 | [JP] | Japan | 8-018048 |

[51] Int. Cl.$^6$ ............................................. G03B 21/14
[52] U.S. Cl. ........................ 353/25; 353/99; 353/78; 355/45
[58] Field of Search ............................ 353/25, 26 R, 353/26 A, 27 R, 27 A, 98, 99, 78, 77; 355/45, 44

[56] References Cited

U.S. PATENT DOCUMENTS

| 4,667,255 | 5/1987 | Lindberg | 358/293 |
| 4,879,572 | 11/1989 | Onuki et al. | 355/45 |
| 4,881,099 | 11/1989 | Onuki et al. | 355/45 |
| 4,886,329 | 12/1989 | Dziemba | 355/45 |
| 4,988,187 | 1/1991 | Kuriyama | 353/26 A |
| 5,065,182 | 11/1991 | Fujita et al. | 355/45 |
| 5,153,635 | 10/1992 | Kahle et al. | 355/45 |
| 5,153,638 | 10/1992 | Sakakibara | 355/45 |
| 5,486,882 | 1/1996 | Yamaguchi et al. | 353/77 |

FOREIGN PATENT DOCUMENTS

| 0346019 | 12/1989 | European Pat. Off. . | |
| 0578532 | 1/1982 | Japan | 353/27 R |
| 389671 | 4/1991 | Japan . | |
| 4320210 | 11/1992 | Japan . | |

*Primary Examiner*—William Dowling
*Attorney, Agent, or Firm*—Fitzpatrick, Cella, Harper & Scinto

[57] ABSTRACT

An image reading apparatus is capable of being switched between an observation state in which an image on a recording medium is projected onto a screen and observed and a read state in which the image is projected onto a reading unit and read. The apparatus includes a projecting lens provided in a lower portion of the apparatus to project the image, a rockable first reflecting member provided in an upper portion of the apparatus to reflect the image light from the projecting lens and, a second reflecting member provided in opposition to the screen to guide the image light reflected by the first reflecting member to the screen. A third reflecting member is provided below the second reflecting member to guide the image light reflected by the first reflecting member to the reading unit. The observation state and the read state are switched by the rocking motion of the first reflecting member.

18 Claims, 16 Drawing Sheets

1

IMAGE READING APPARATUS

BACKGROUND OF THE INVENTION

1. Field of the Invention

The present invention relates to an image reading apparatus for projecting an image onto an image sensor, reading the image, and obtaining an electrical image signal.

2. Related Background Art

A microfilm scanner 100 shown in FIG. 14 is an example of conventional apparatuses of this sort. This microfilm scanner 100 bends image light 101 from a microfilm F by using projecting mirrors 102 and 103 to project the light onto a screen 104 in an enlarged scale. On the back side of the screen 104, the image light 101 is guided to a line sensor 106 by a mirror 105, and scan reading of an image and retraction of these components is done by vertically moving the components.

Unfortunately, in the microfilm scanner with this construction, external light readily enters the line sensor 106 through the screen as indicated by an arrow A and remains as noise on the read image.

Also, the line sensor 106 is positioned immediately behind the screen and therefore readily influenced by external electromagnetic waves. Furthermore, the line sensor 106 itself emits harmful electromagnetic waves.

In addition, since the image light 101 is incident more obliquely on the screen 104 as the incident position becomes closer to the peripheral portion, the angle of the incident light to the line sensor 106 also gradually changes during the scan. An angle θ shown in FIG. 15 is necessary as the light receiving angle of the line sensor 106. The line sensor 106 consists of light receiving elements 107 arranged in a line. Generally, these light receiving elements 107 are covered with a clear portion 108 made from, e.g., a transparent silicone resin in order to be protected from oxidation, dust, or an external force.

Since, however, images are degraded if bubbles or foreign matter 109 is mixed in the clear portion 108, it is necessary to use an expensive line sensor 106 having a clear portion 108 whose transmittance is uniform within the light receiving angle θ. Also, even if a slit 110 is provided before the line sensor 106 so that light except for light within the light receiving angle θ does not enter, external light (arrow A) reflected by the projecting mirror 103 and the scan mirror 105 reaches the line sensor 106 through the opening of the slit 110 during scanning because the light receiving angle θ is large. This decreases the image read accuracy.

FIG. 16 is a schematic view showing a microfilm scanner 200 as another conventional example. This microfilm scanner 200 swings image light 202 by pivoting a rotating mirror 201, thereby switching the optical path to a screen 203 or a line sensor 204 and performing image scanning to the line sensor 204.

In this optical arrangement, however, the rotating mirror 201 is arranged immediately above a projecting lens 205. This elevates the position of the screen 203 and makes observation of the projected image difficult.

Accordingly, a structure in which the mirror 201 is movable back and forth also is considered. However, the moving mechanism is complicated and expensive and the movement is time-consuming. Consequently, the image read speed of the apparatus decreases.

In an apparatus with the scan system which swings the image light 202 by using the rotating mirror 201, as the rotating mirror 201 is set closer to the projecting lens 205 the radius of swing increases and the swing angle during the scan decreases. Consequently, as illustrated in FIG. 17, a light receiving angle θ' of the line sensor 204 decreases and hence is not readily influenced by bubbles or the like 206 as described above. However, as shown in a schematic view of swing scan in FIG. 18, when an image formation plane 207 is swing-scanned the optical path length to the end portion of an image changes by dL from the optical path length to the central portion. Since this apparatus is an enlarging projection system, when the optical path length thus changes the enlargement ratio of the image light 202 also changes. That is, the vertical magnification of an image read by the line sensor 204 changes with the swing scan, resulting in a barrel-shaped image with distortions. Also, in order to simplify the control and stabilize the rotation of the rotating mirror 201, the rotating mirror 201 is generally rotated at a fixed angular velocity. FIG. 19 shows a schematic view of the scan state when image light is swung at a fixed angular velocity. When the rotating mirror 201 is rotated at a fixed angular velocity $d\alpha$, image light swings at a fixed angular velocity $2d\alpha$. However, the scan rate on the image formation plane 207 is $dx_1 > dx_2 > dx_3$ ($dx_n = dx_n'$), i.e., the scan rate in the end portion of an image is higher than that in the central portion. Consequently, the image read by the line sensor 204 expands or contracts in the direction of swing. Note that like the influence of the bubbles or the like 206 described previously, the influence of these image distortions on an image can be decreased as the rotating mirror 201 is set closer to the projecting lens 205 because the radius of swing is increased. For this reason, in conventional apparatuses the rotating mirror 201 is arranged immediately above the projecting lens 205.

Unfortunately, if the rotating mirror 201 is arranged immediately above the projecting lens 205 as in the microfilm scanner 200 shown in FIG. 16, the position of the screen 203 is elevated and this makes the projected image difficult to observe. Accordingly, the use of a retractable rotating mirror also is considered. However, the retracting mechanism is complicated and expensive. Also, the problems of the image distortions and the light receiving angle of the line sensor are not eliminated but are merely alleviated.

SUMMARY OF THE INVENTION

The present invention has been made to solve the above conventional problems and has as its object to provide an image reading apparatus which has a screen arranged in a proper position and easily observable, a simple inexpensive construction, and a high processing speed, and which is not readily influenced by external light and is strong against harmful electromagnetic waves.

It is another object of the present invention to control the incident angle of image light to a rockable reading unit by providing an attitude control means for controlling the attitude of the reading unit.

The present invention has been made to achieve the above objects and provides an image reading apparatus capable of being switched between an observation state in which an image on a recording medium is projected onto a screen and observed and a read state in which the image is projected onto a reading unit and read, comprising a projecting lens provided in a lower portion of the apparatus to project the image, a rockable first reflecting member provided in an upper portion of the apparatus to reflect the image light from the projecting lens, a second reflecting member provided in opposition to the screen to guide the image light reflected by the first reflecting member to the screen, a third reflecting member provided below the second reflecting member to guide the image light reflected by the first reflecting member to the reading unit, wherein the observation state and the read state are switched by the rocking motion of the first reflecting member.

The apparatus further comprises attitude control means for controlling the attitude of the reading unit in accordance with the rocking motion of the first reflecting member. Consequently, it is possible to control a change in the incident angle of the image light to the reading unit caused by the rocking motion of the first reflecting member.

Also, the incident angle of the image light to the reading unit is so controlled as to be substantially constant. This allows accurate image read even with the use of an inexpensive reading means having a small light receiving angle.

The apparatus further comprises optical path length correcting means for correcting the optical path length of image light entering the reading unit by reflecting the light by using reflecting means provided in the reading unit so as to be free to rock. This prevents image distortions caused by a change in the optical path length.

The apparatus also comprises reading unit holding means which rectilinearly moves, an optical path length correcting cam for regulating the movement of the means, and an attitude regulating cam for regulating the attitude of the reading unit. The optical path length correcting cam and the attitude regulating cam are provided on a common driving shaft. This prevents image distortions and provides a highly reliable image reading apparatus with a simple inexpensive construction.

DETAILED DESCRIPTION OF THE PREFERRED EMBODIMENTS

Figure 1:
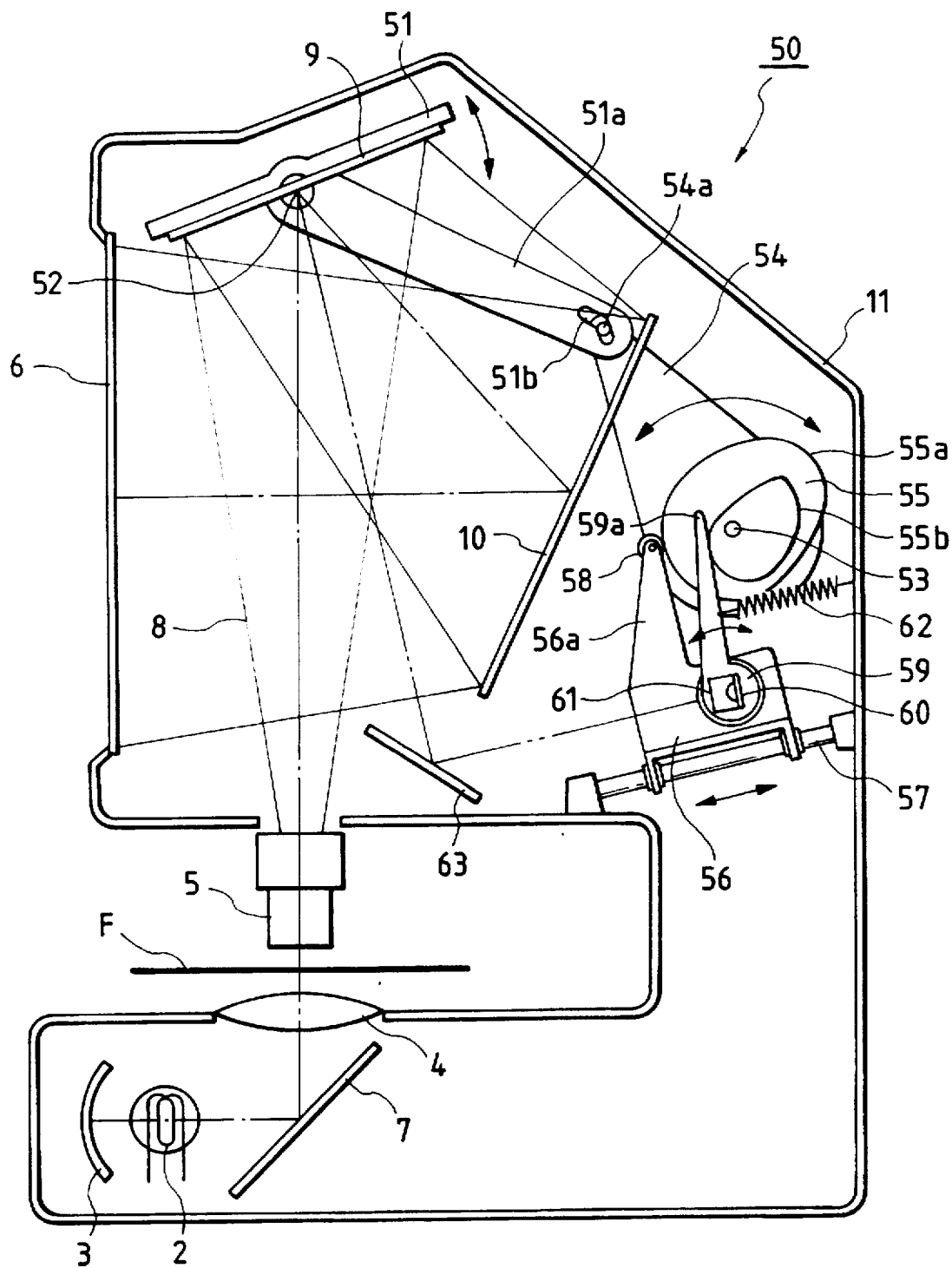
FIG. 1 is a longitudinal sectional view of an image reading apparatus according to the present invention.

FIG. 1 is a schematic view of a microfilm scanner 50 as an image reading apparatus according to the present invention.

Figure 5:
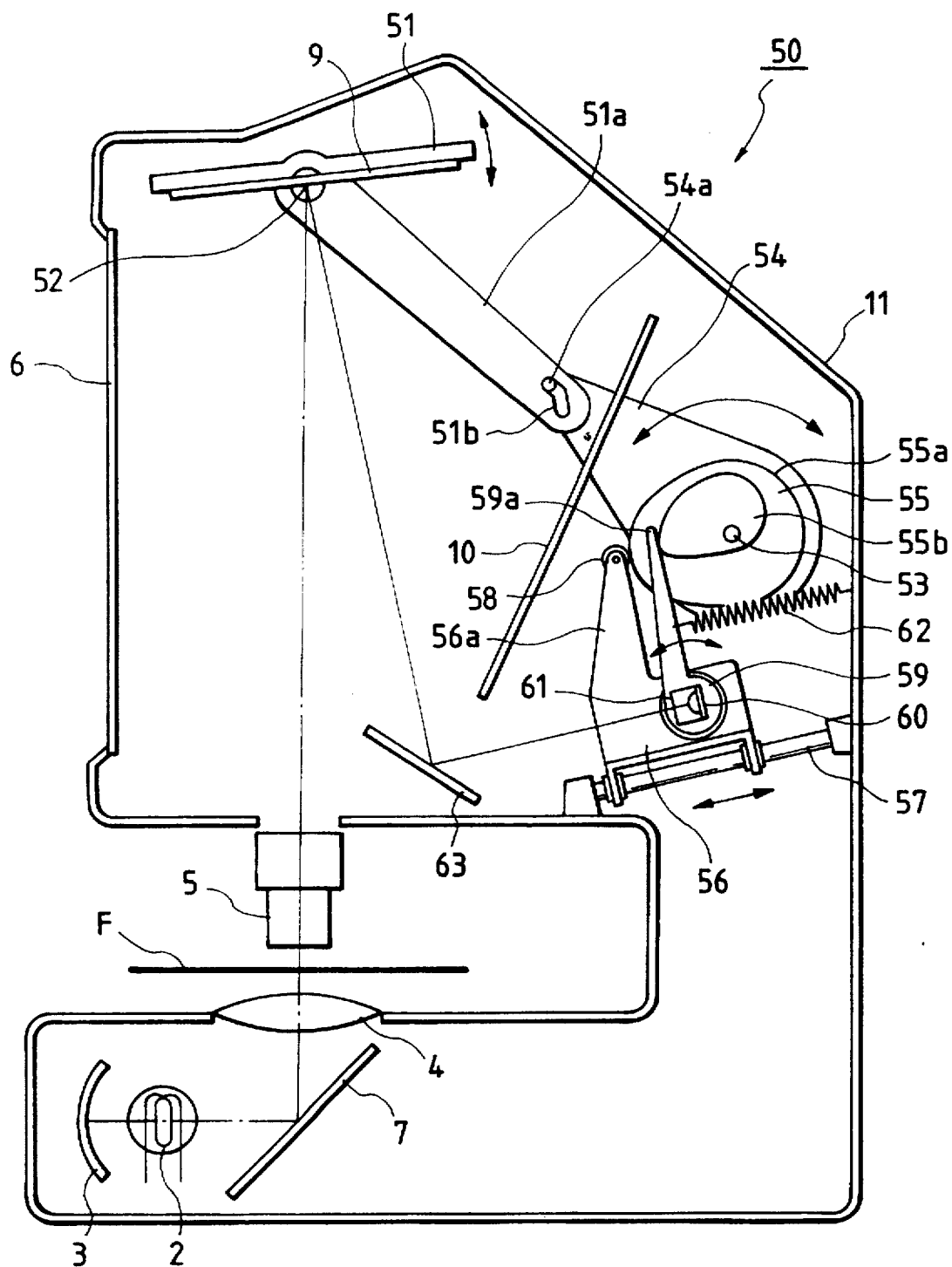
FIG. 5 is a longitudinal sectional view of the image reading apparatus according to the present invention when the apparatus reads the center of an image.

The microfilm scanner 50 according to the present invention has a screen projecting optical path shown in FIG. 1 and an image reading unit projecting optical path shown in FIG. 5. The screen projecting optical path is formed by a ceiling mirror 9 as a first reflecting member and a mirror 10 as a second reflecting member. The image reading unit projecting optical path is formed by the ceiling mirror 9 and a mirror 63 as a third reflecting member.

Figure 2:
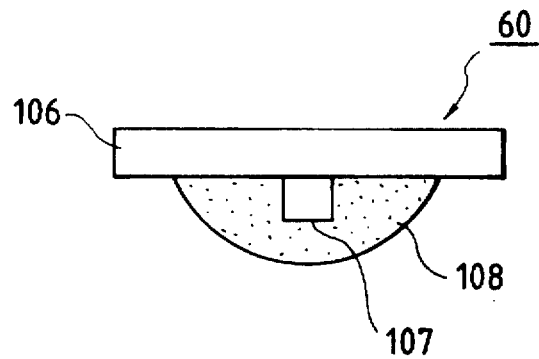
FIG. 2 is an enlarged view of a line sensor of the image reading apparatus.
Figure 2:
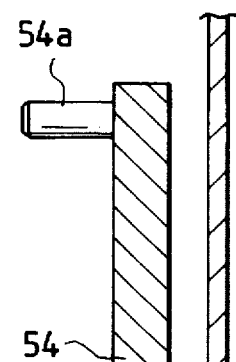

The microfilm scanner 50 includes a housing 11 and a light source 2. Illuminating light emitted by the light source 2 is condensed by a spherical reflecting mirror 3 and a field lens 4 and reflected by a mirror 7, illuminating a microfilm F sandwiched between a pair of glass plates (not shown). The light transmitted through the microfilm F is projected onto a screen 6 or a line sensor 60 as an image reading unit by a projecting lens 5. The line sensor 60 is arranged behind the reflecting mirror 10. As shown in FIG. 2, the line sensor 60 consists of a substrate 106, light receiving elements 107 arranged in a line, and a clear portion 108 made from, e.g., a silicone resin. The clear portion 108 protects the light receiving elements 107 from oxidation or an external force.

The ceiling mirror 9 as the first reflecting member is fixed to a ceiling mirror base 51 so that the reflecting surface points downward. The ceiling mirror base 51 is rockable about an intersecting line 52 of the reflecting surface of the ceiling mirror 9 and the projecting optical axis. The ceiling mirror base 51 has an arm 51a at its back, and a groove 51b is cut in the distal end portion of the arm 51a. The groove 51b has a dogleg shape in which a portion extending radially from the rocking center 52 continues to an inclined portion.

A scan lever 54 is rockably attached to a rotating shaft 53 arranged on the back side of the apparatus 50. An engagement shaft 54a protrudes from the end portion of the scan lever 54 and engages with the groove 51b of the ceiling mirror base 51. This engagement allows the ceiling mirror table 51 to rock when the scan lever 54 rocks. A cam 55 also is rotatably attached to the rotating shaft 53. The cam 55 has two cam surfaces, i.e., an optical path length correcting cam 55a and an attitude regulating cam 55b.

Below the rotating shaft 53 a slide base 56 is attached to a slide shaft 57 so as to be movable back and forth. A sensor holder 59 is rockably held by the slide base 56. The line image sensor 60 and a slit 61 are fixed to the sensor holder 59. Note that the rocking center of the sensor holder 59 is in the same position as the light receiving line of the line sensor 60. The slide base 56 has an arm 56 a having a roller 58 in its distal end portion, and the sensor holder 59 has an arm 59a These arms 56 a and 59 a are biased by a tension spring 62 to abut against the optical path length correcting cam 55a and the attitude regulating cam 55b, respectively. That is, the position and attitude of the line sensor 60 are determined by the rotational angle of the cam 55.

Below the reflecting mirror 10, as illustrated in FIG. 5, a reflecting mirror 63 is fixed with its reflecting surface facing the back side of the apparatus so that the projected light from the ceiling mirror 9 is guided to the line sensor 60.

Figure 3:
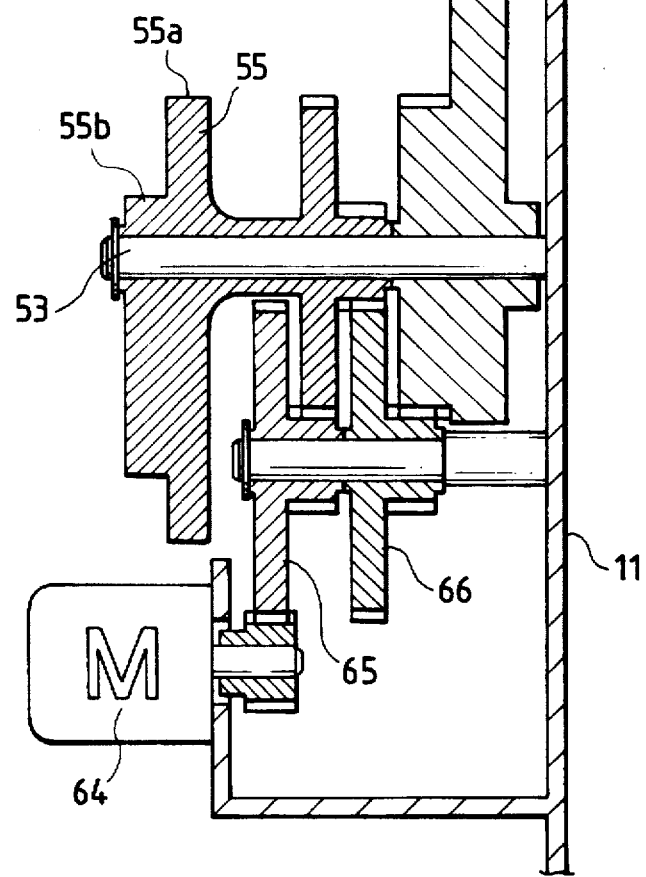
FIG. 3 is a sectional view of a driving unit of the image reading apparatus according to the present invention.

FIG. 3 shows a unit for transmitting a driving force to the scan lever 54 and the cam 55. The output from a scan motor 64 which is rotatable in the forward and backward directions is decelerated by a gear 65 and transmitted to the cam 55. The output is further decelerated by a gear 66 and transmitted to the scan lever 54. The scan lever 54 can be controlled into an optional attitude by a detecting means (not shown).

In the microfilm scanner 50 with the above construction, the scan lever 54 normally stays in the position shown in FIG. 1, forming a so-called observation optical path through which an image of the microfilm F is projected onto the screen 6. This optical path is so bent as to cross itself and guided to the screen 6 by the ceiling mirror 9 and the reflecting mirror 10.

Figure 4:
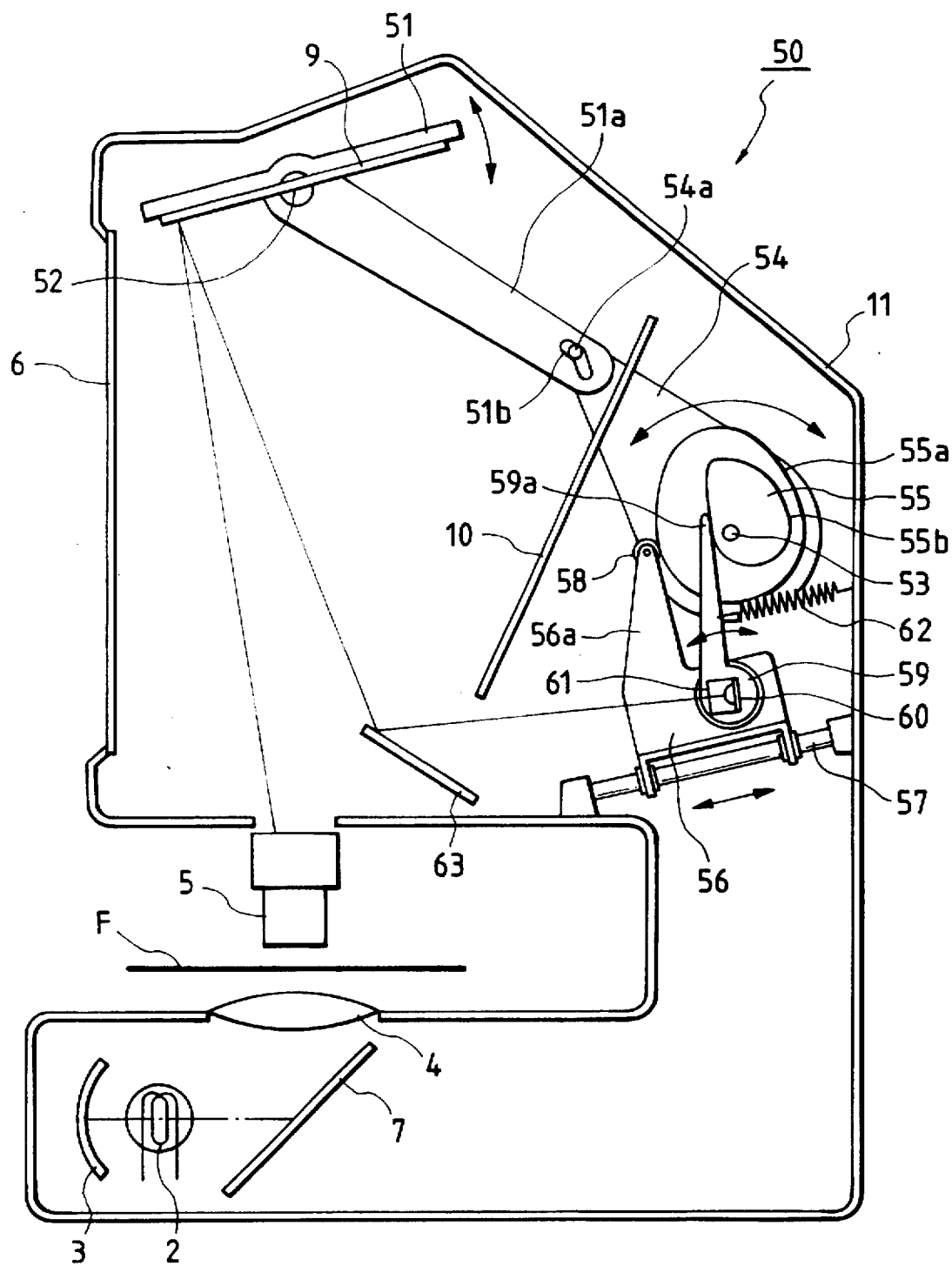
FIG. 4 is a longitudinal sectional view of the image reading apparatus according to the present invention when the apparatus starts reading.
Figure 6:
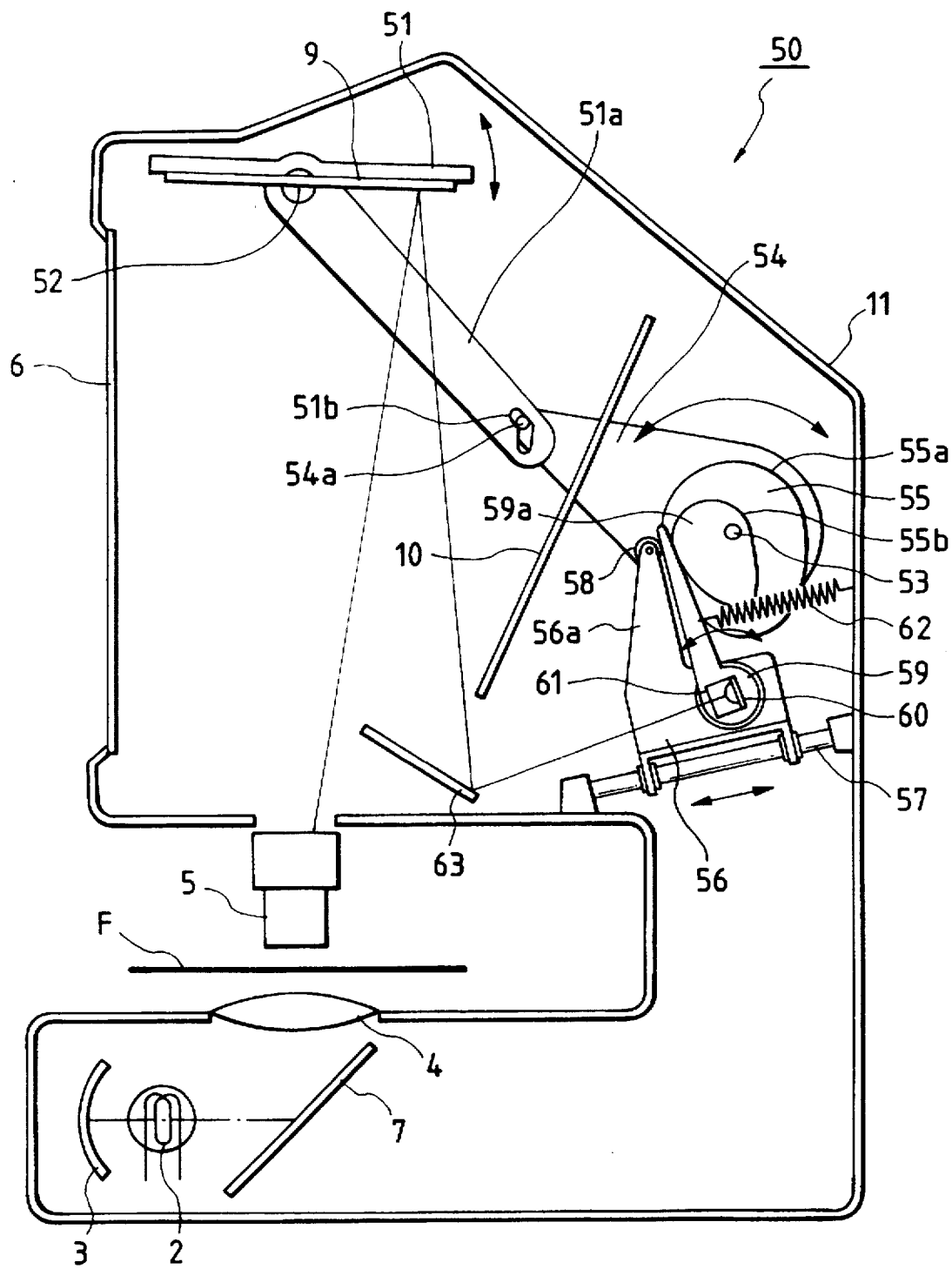
FIG. 6 is a longitudinal sectional view of the image reading apparatus according to the present invention when the apparatus completes reading.

When an image read switch (not shown) is depressed, the scan lever 54 is rotated counterclockwise by the rotation of the scan motor 64. Accordingly, the ceiling mirror base 51 and the ceiling mirror 9 rotate clockwise and swing the image light. As shown in FIG. 4, image read is started when light from the leading edge of an image reaches the line sensor 60 via the reflecting mirror 63. When the trailing edge of the image is reached as in FIG. 6 after the center of the image is read as in FIG. 5, the scan motor 64 starts rotating in the reverse direction to return the mechanism to the observation state in FIG. 1.

Figure 10:
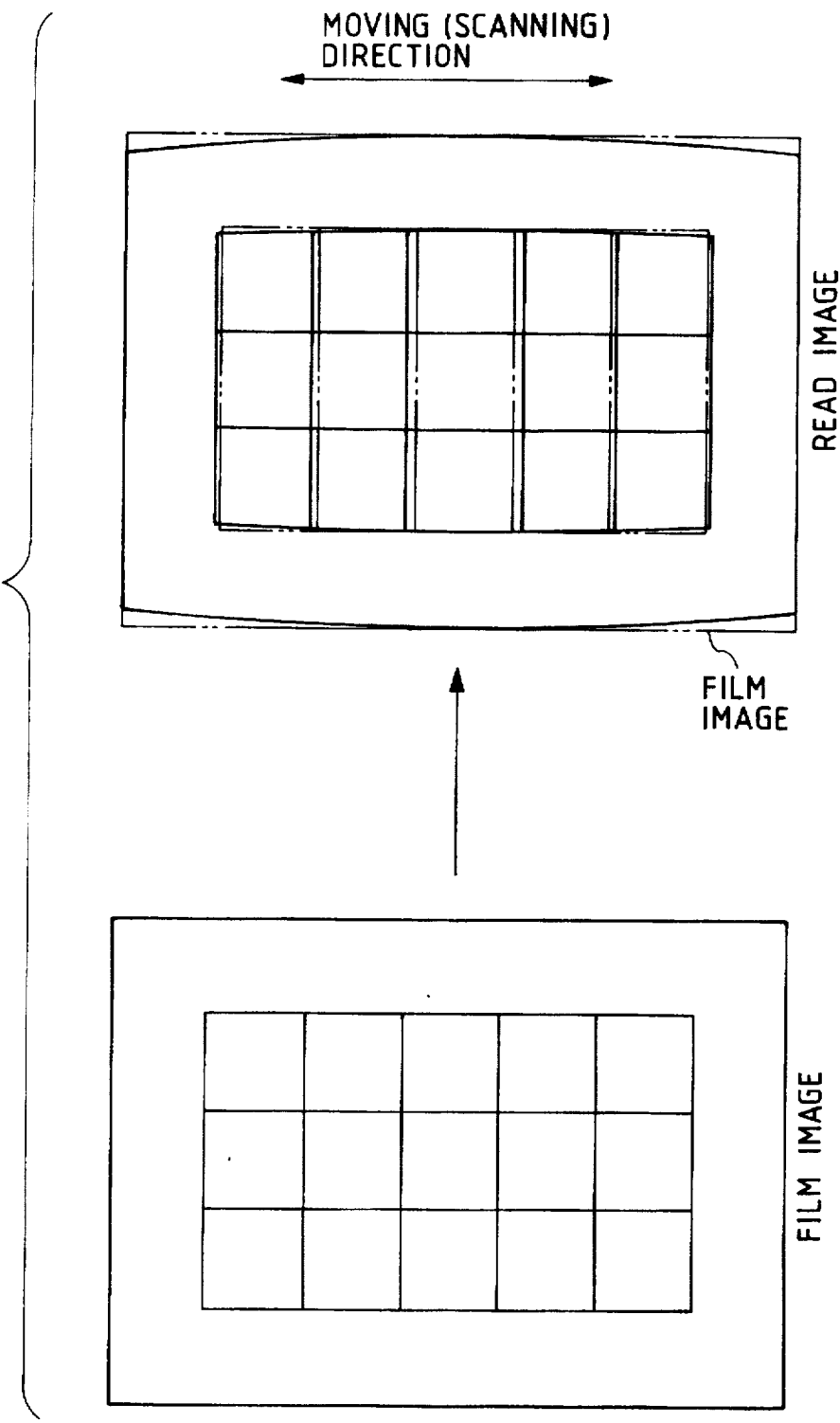
FIG. 10 is a view showing image distortions caused by a change in the optical path length of the image reading apparatus.

As the scan lever 54 is rotated as described above, the positions and attitudes of the line sensor 60 and the slit 61 change as follows. When the image read is started (FIG. 4), the line sensor 60 and the slit 61 are in the rear end and point most upward. When the center of an image is read (FIG. 5), the line sensor 60 and the slit 61 move to the front end and take an intermediate attitude. When the image read is completed (FIG. 6), the line sensor 60 and the slit 61 return to the rear end and point most downward. That is, the optical path length is so corrected that the projected image formation position and the light receiving line position of the line sensor 60 remain the same at any instant, and the inclination of the image light is so corrected that the light enters at a fixed angle into the line sensor 60. These corrections are done to avoid image distortions caused by a change in the optical path length and minimize the influence of dust adhered to the line sensor 60. FIG. 10 shows distortions of the read image when the optical path length is not corrected.

Figure 7:
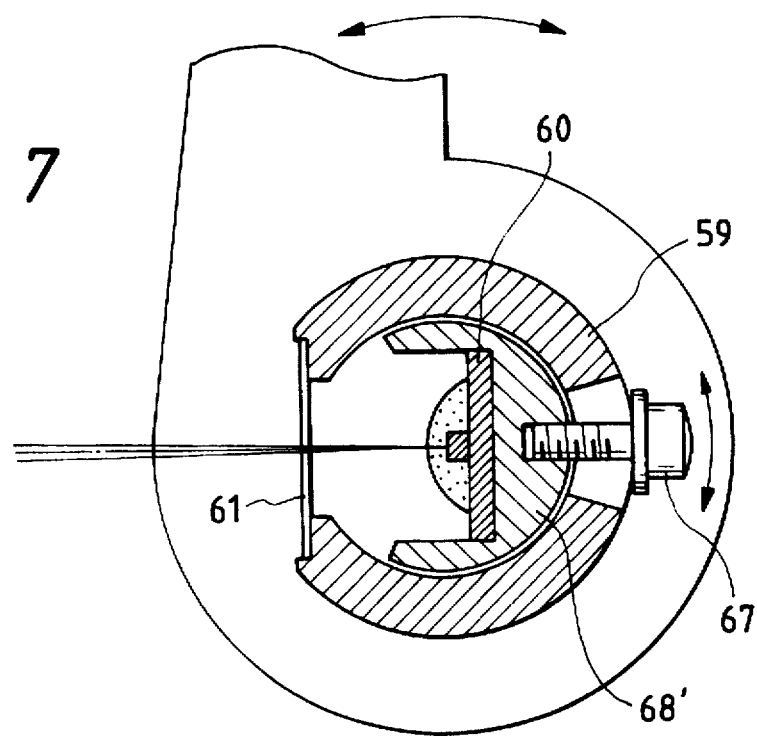
FIG. 7 is an enlarged view of an image reading unit of the image reading apparatus according to the present invention.
Figure 8:
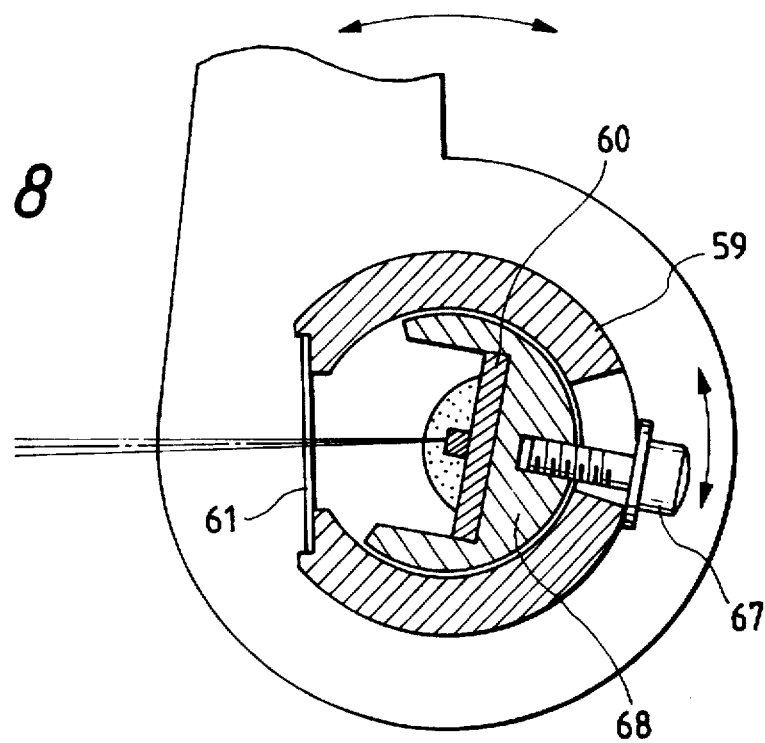
FIG. 8 is an enlarged view of the image reading unit of the image reading apparatus according to the present invention.

The sensor holder 59 has a double structure as shown in FIG. 7. The line sensor 60 and an adjustment base 68 can be rotated to the center of a light receiving line by loosening an adjustment machine screw 67 as a locking means. That is, any given angle can be selected as the incident angle of the projected light to the line sensor 60. As an example, even if dust adheres to a portion within the light receiving angle of the line sensor 60 and produces a stripe on an image in FIG. 7, this trouble can be avoided by changing the angle of the line sensor 60 as shown in FIG. 8.

Figure 9:
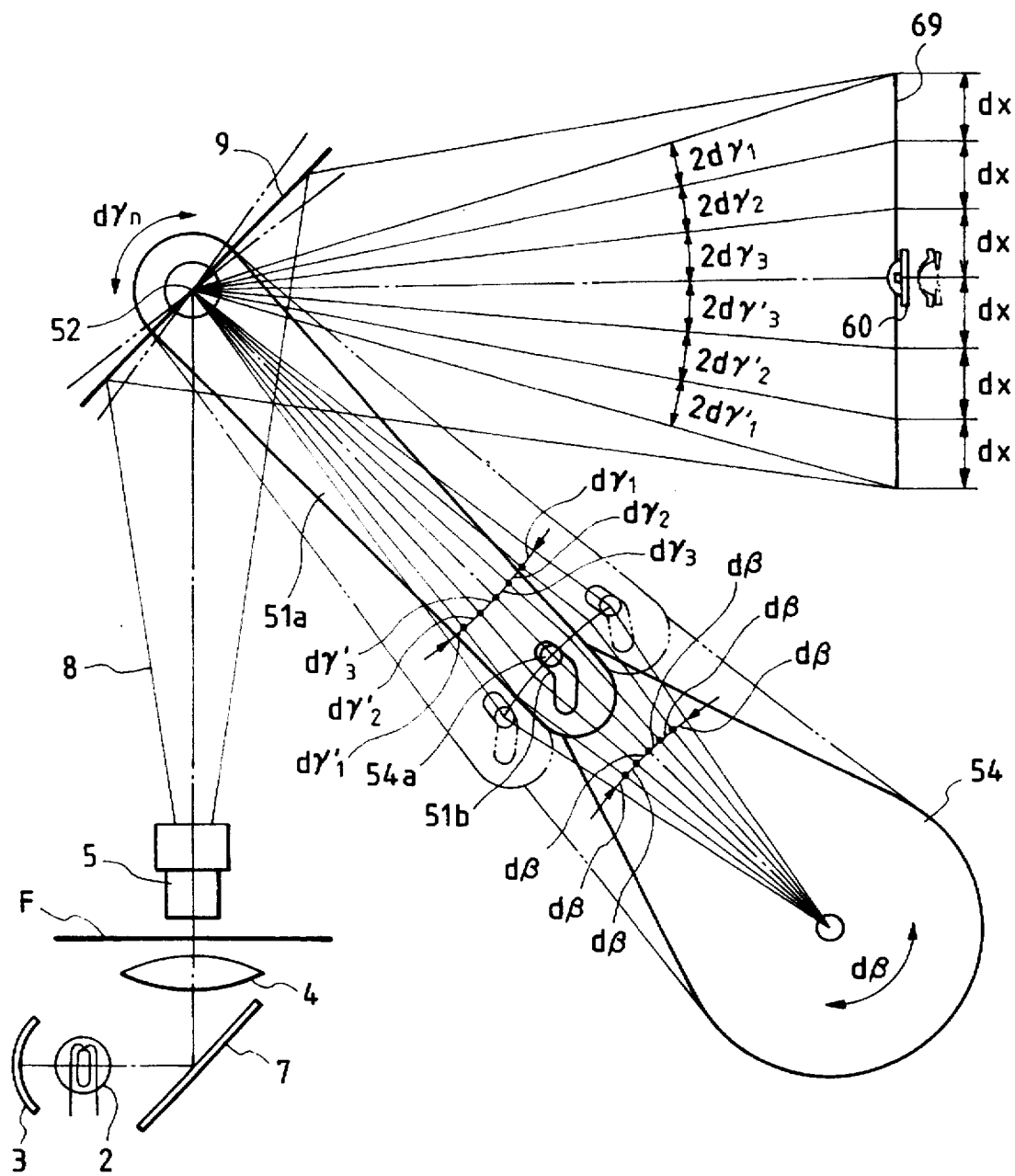
FIG. 9 is a view showing a scan lever and the image scan rate in the image reading apparatus according to the present invention.

FIG. 9 shows the relationship between the rotation of the scan lever 54 and the movement (scan) of an image projected onto the line sensor 60. When the scan lever 54 rotates at a fixed angular velocity d$\beta$, the angular velocity of the ceiling mirror 9 which rotates via the arm 51a becomes d$\gamma$1<d$\gamma$2<d$\gamma$3 (d$\gamma$n=d$\gamma$n'). This angular velocity decreases as the position approaches the end portion of an image. In contrast, the moving (scanning) speed of an image formation plane 69 increases as the position approaches the end portion of an image if the ceiling mirror 9 rotates at a fixed speed. Consequently, these angular velocity and moving speed cancel and correct each other, and so the moving (scanning) speed of the image formation plane 69 is approximately maintained at a fixed speed dx. Note that the groove 51b has a dogleg shape in order to shorten the time necessary for transition between the read state and the observation state.

In the above embodiment, the screen can be arranged in an appropriate position and easily observed since the projecting optical path is efficiently bent. Also, the construction is simple and inexpensive because switching between the observation optical path and the read optical path is done only by rotating the first reflecting member.

In addition, the image read speed is high because the image read scan and the optical path switching are performed by a series of rotations of the first reflecting member.

Furthermore, the image reading unit is arranged on the rear surface side of the second reflecting member and hence is not readily influenced by external light transmitted through the screen. Also, since the image reading unit can be arranged in the innermost part of the apparatus, a structure strong against harmful electromagnetic waves can be realized.

In this apparatus, the reflecting surface of the first reflecting member taking part in image read points downward, and the reflecting surface of the third reflecting member also participating in image read faces the back side of the apparatus. Accordingly, the reflecting surfaces of these reflecting members are not irradiated with external light transmitting through the screen. This makes the apparatus not readily influenced by external light.

Figure 11:
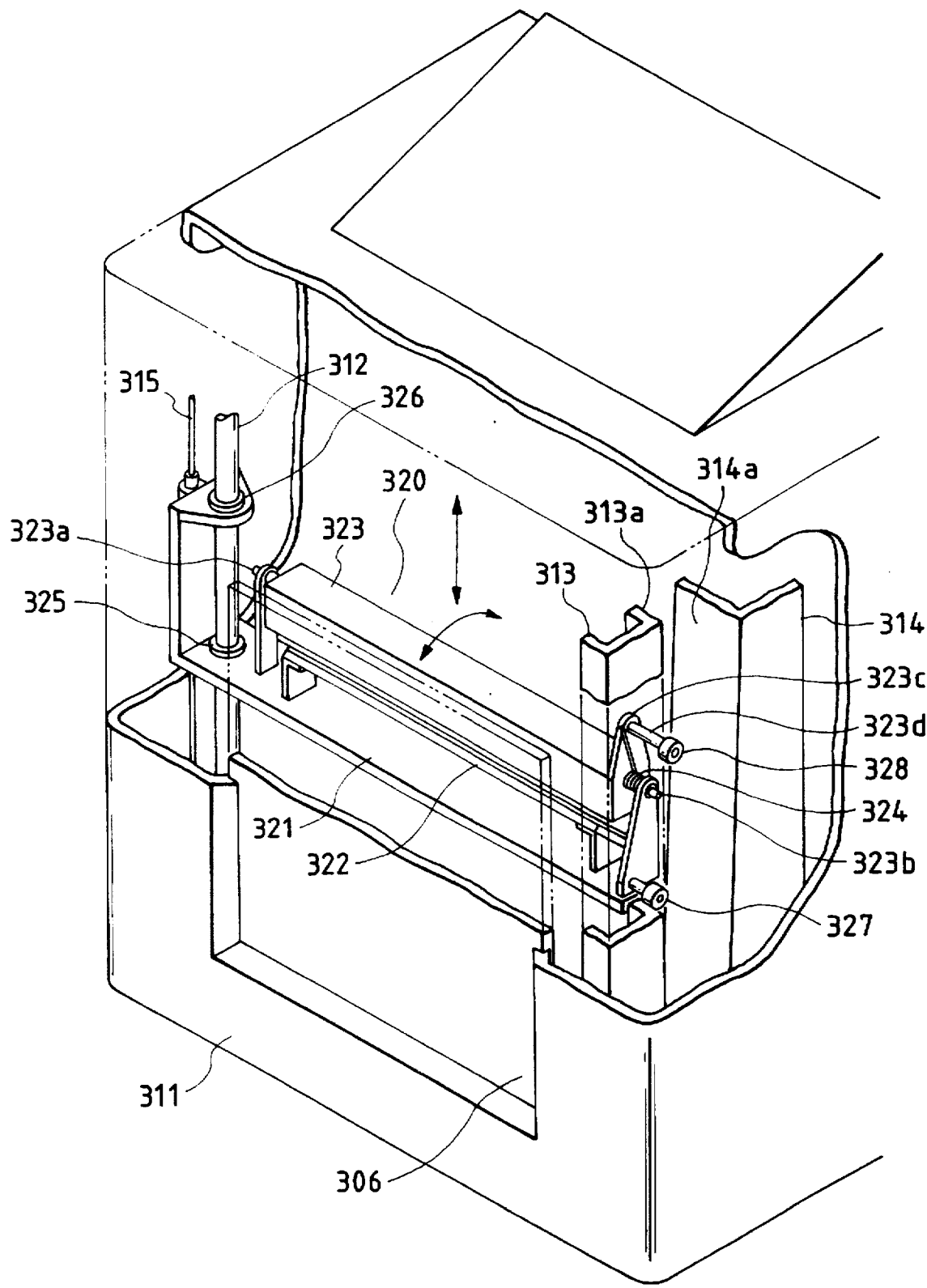
FIG. 11 is a perspective view of a scan unit of the second embodiment.
Figure 12:
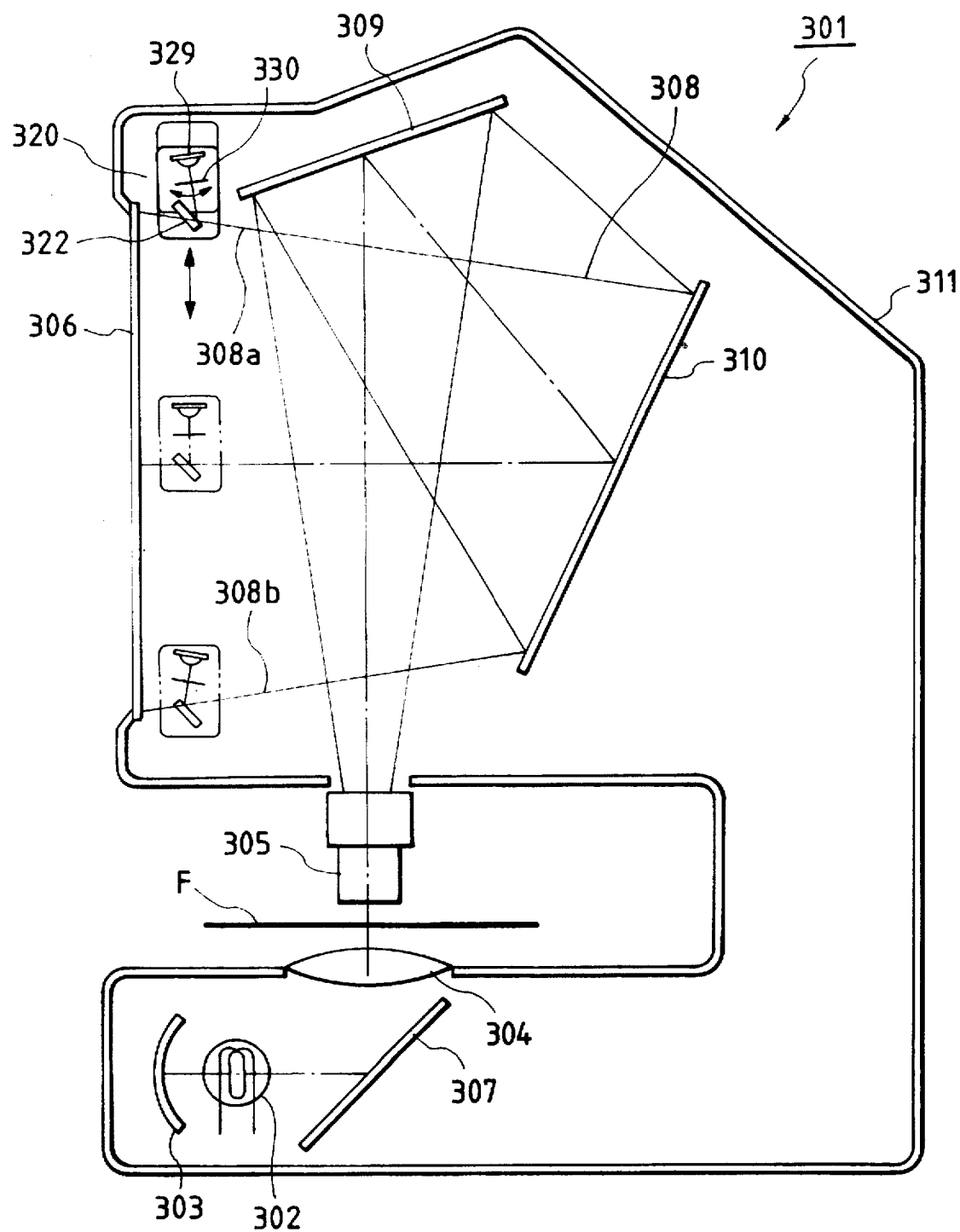
FIG. 12 is a schematic view of an overall image reading apparatus of the second embodiment.

FIGS. 11 and 12 are schematic views of a microfilm scanner 301 as an image reading apparatus according to the second embodiment of the present invention. This image reading apparatus includes an original projecting means consisting of a light source 302, a spherical reflecting mirror 303, a field lens 304, a projecting lens 305, reflecting mirrors 309 and 310, and a screen 306. Illuminating light from the light source 302 is condensed by the spherical reflecting mirror 303 and the field lens 304, illuminating a microfilm F sandwiched between a pair of glass plates (not shown). The transmitted light is projected onto the screen 306 by the projecting lens 305. Note that the illuminating light is bent by a reflecting mirror 307, projected light 308 is bent by the reflecting mirrors 309 and 310, and both the light components are contained in a housing 311. A scanner unit 320 is arranged behind the screen 306. In the present invention, a reading unit is provided in the scanner unit 320 as a scan section.

FIG. 11 is a perspective view showing the scanner unit 320 of the microfilm scanner 301. The scanner unit 320 primarily consists of a scan base 321, a reflecting mirror 322, and a sensor holder 323. The sensor holder 323 and an internal reading means constitute the reading unit. The rectangular reflecting mirror 322 is fixed with an inclination of 45° on the scan base 321. The sensor holder 323 is arranged above the reflecting mirror 322. Shafts 323a and 323b on the two sides of the sensor holder 323 are rockably supported by the scan base 321. A helical torsion spring 324 as an elastic member is hooked on a shaft 323d at the distal end portion of an arm 323c provided on the right side of the sensor holder 323. The helical torsion spring 324 applies a torsional biasing force in the rocking direction of the sensor holder 323.

In the left part of the housing 311, a scan shaft 312 as a first guide member is fixed vertically. The scan base 321 is so supported as to be vertically movable by the scan shaft 312 and bearings 325 and 326 arranged on the left side of the scan base 321. In the right part of the housing 311, a scan rail 313 having a vertical guide surface 313a is disposed. An inclined rail 314 as a second guide member having a guide surface 314a slightly inclined from the vertical direction is disposed behind the scan rail 313. These two rails 313 and 314 are disposed on the two sides of a roller 327 arranged on the right side of the scan base 321 and a roller 328 as a rotating member attached to the shaft 323d at the distal end portion of the arm 323c of the sensor holder 323. The roller 327 is biased to abut against the guide surface 313a of the scan rail 313 and the roller 328 is biased to abut against the guide surface 314a of the inclined rail 314, by the torsional force of the helical torsion spring 324. That is, the scan rail 313 regulates the rotation about the scan shaft 312 of the scan base 321, and the inclined rail 314 regulates the rocking motion of the sensor holder 323. A driving wire 315 is hooked on the left side of the scan base 321, and the vertical movement of the scan base 311 is controlled by a scan motor and a position detecting means (neither is shown). When the scan base 321 vertically moves, the roller 328 of the sensor holder 323 rolls on the guide surface 314a of the inclined rail 314. Accordingly, the sensor holder 323 vertically moves together with the scan base 321 and gradually changes its attitude in accordance with the position in the vertical direction.

Figure 13:
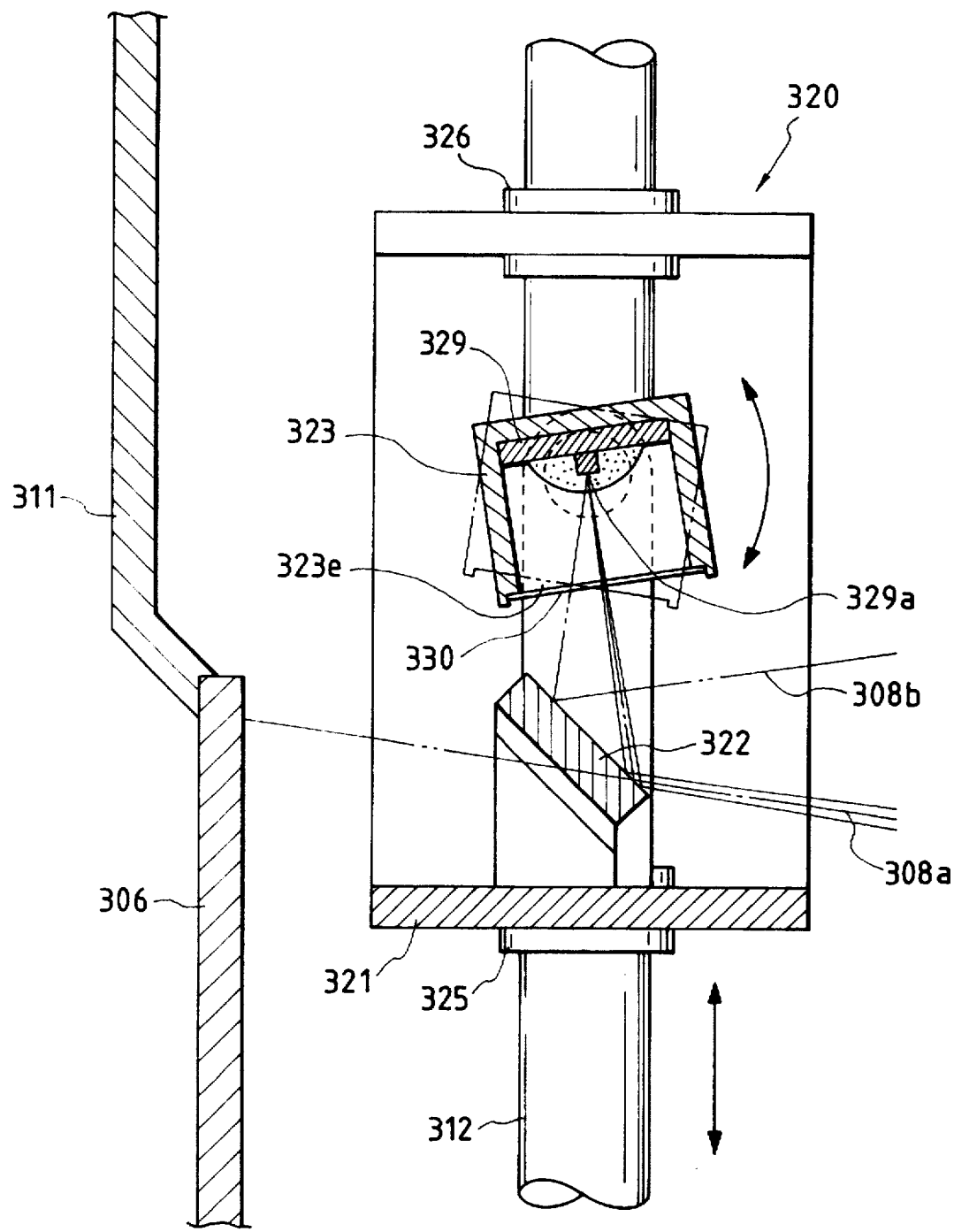
FIG. 13 is a sectional view of the scan unit of the second embodiment.
Figure 14:
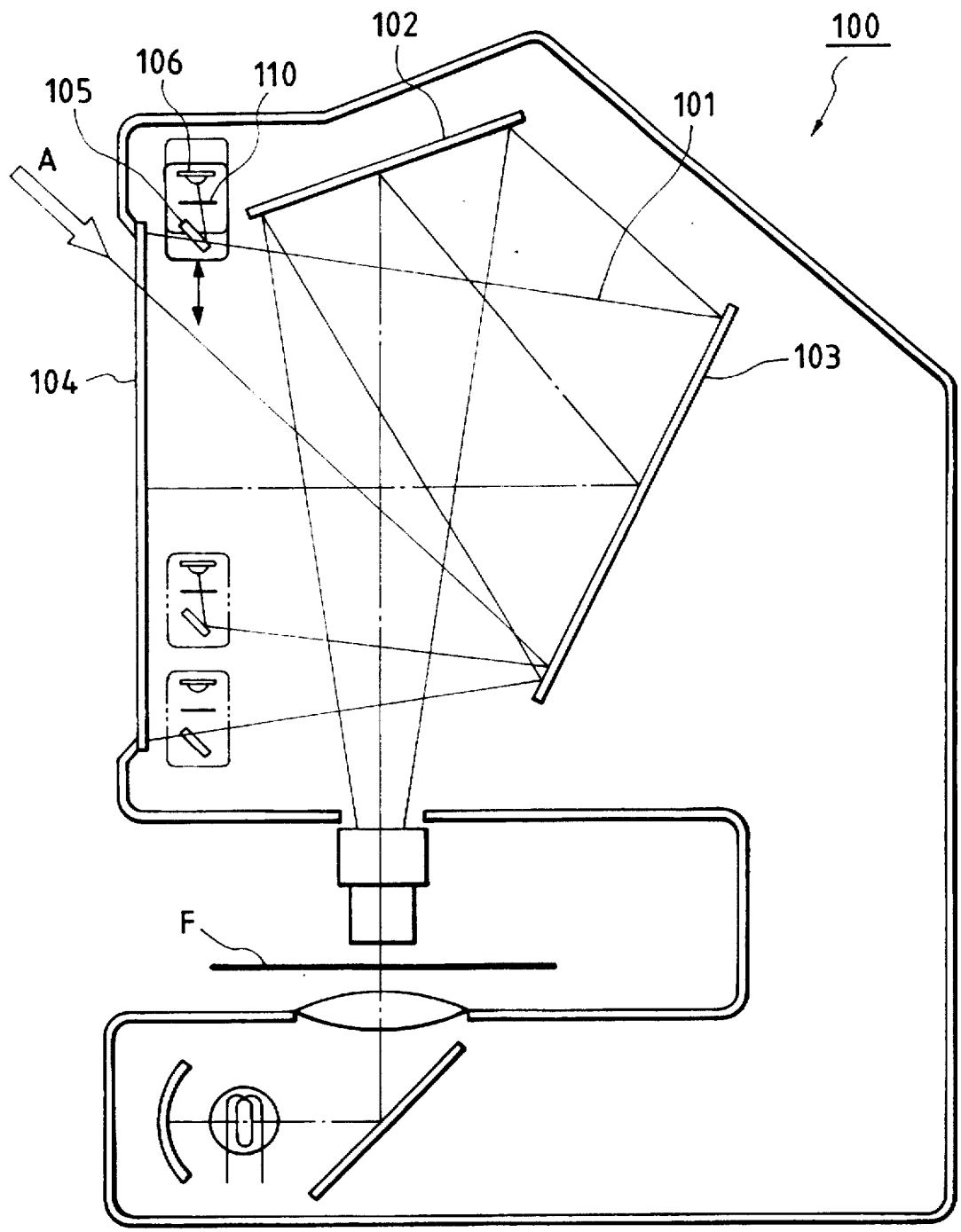
FIG. 14 is a schematic view of a first prior art.
Figure 15:
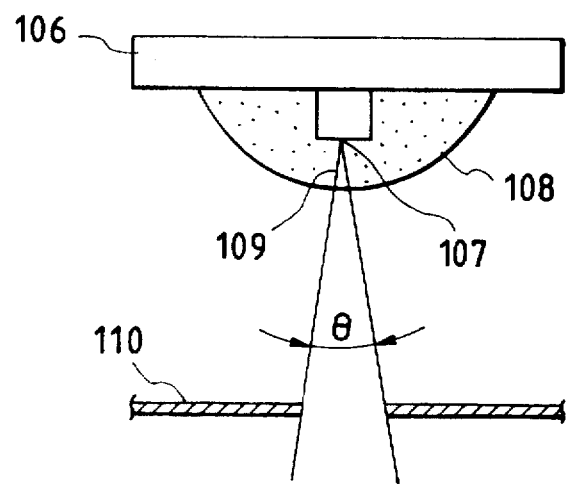
FIG. 15 is an enlarged view of a line sensor of the first prior art.
Figure 17:
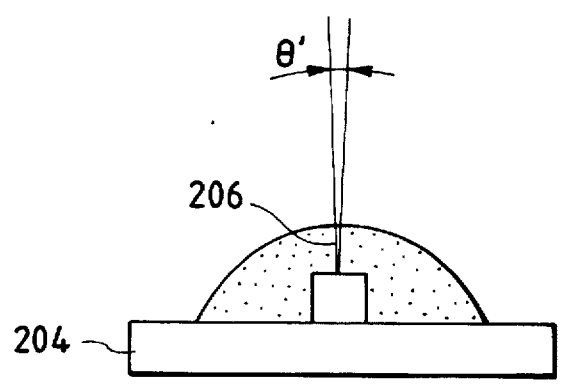
FIG. 17 is an enlarged view of a line sensor of the second prior art.
Figure 16:
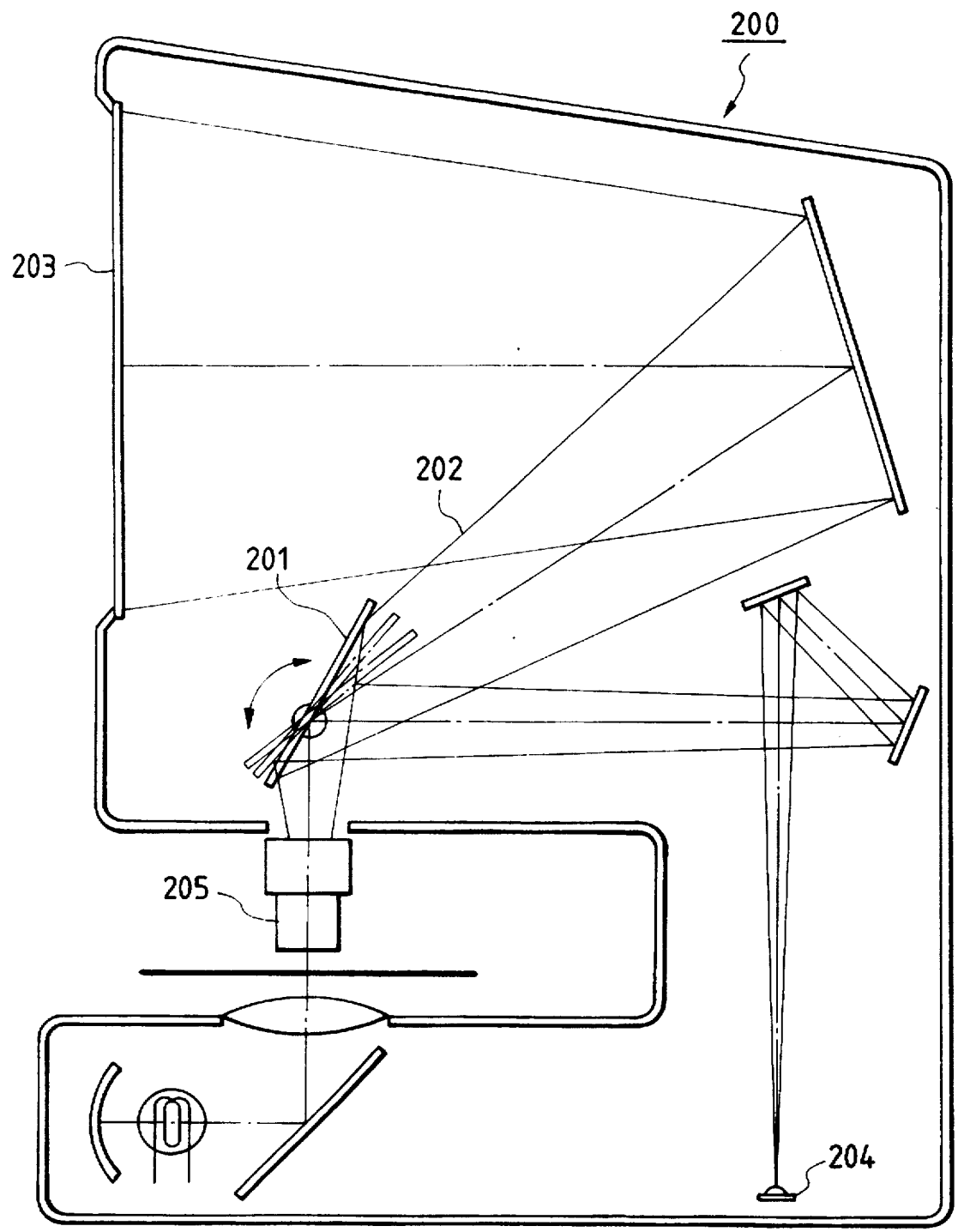
FIG. 16 is a schematic view of a second prior art.
Figure 18:
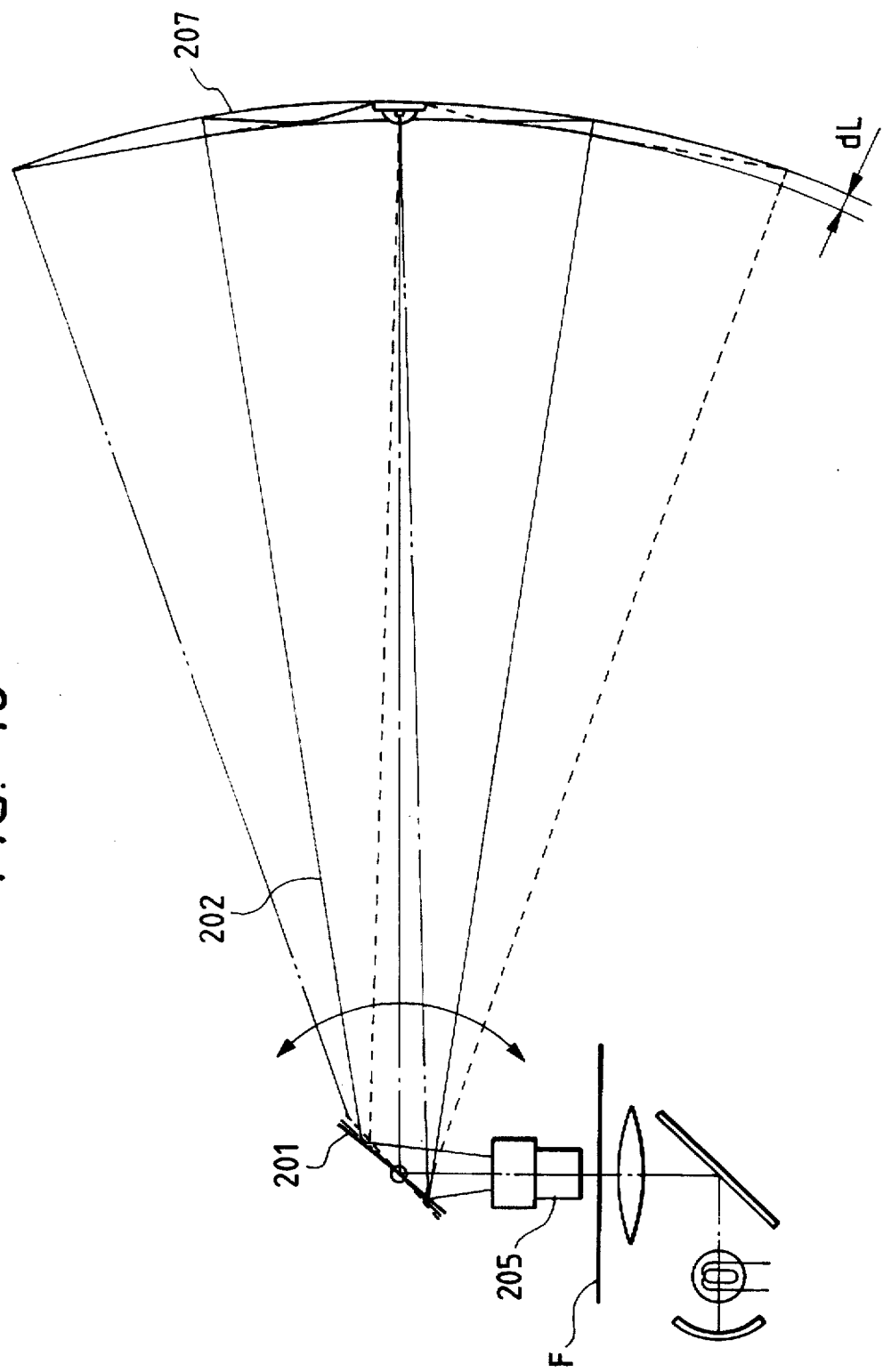
FIG. 18 is a view for explaining image distortions caused by variations in optical path length in the second prior art.
Figure 19:
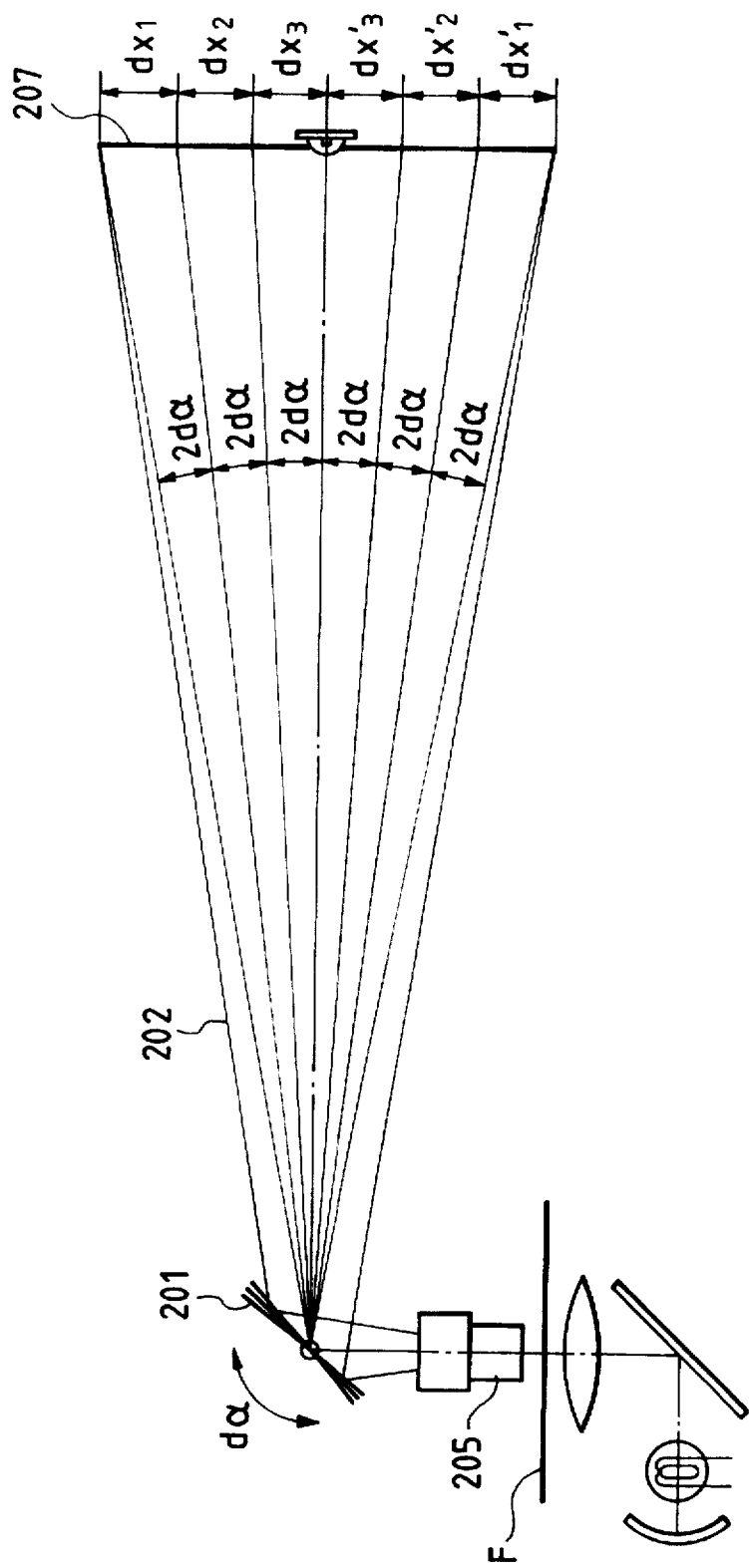
FIG. 19 is a view for explaining image distortions caused by variations in scan rate in the second prior art.

FIG. 13 is a sectional view of the scan unit 320. The sensor holder 323 has a U sectional shape having an opening 323e in the lower portion. A line sensor 329 as a reading means is fixed to point downward inside the sensor holder 323. A slit 330 is formed in the opening 323e. The rocking center of the sensor holder 323 is in the same position as a light receiving line 329a of the line sensor 329. Accordingly, when the sensor holder 323 rocks, the position of the light receiving line 329a with respect to the scan base 321 remains unchanged and only the direction of the light receiving line 329a changes. The line sensor 329 can exchange electrical signals with an image processor (not shown) through, e.g., a cable (not shown).

In the microfilm scanner 301 with the above arrangement, an image of the microfilm F can be projected onto the screen 306 and observed. When an image read switch (not shown) is depressed, the scan unit 320 which is retracted to the uppermost portion moves down and the reflecting mirror 322 guides the image light to the line sensor 329. The image information converted into an electrical signal is transmitted to the image processor (not shown) and recorded. The sensor holder 323 gradually changes its attitude in accordance with the vertical movement due to the action of the inclined rail 314 described above. That is, in accordance with the width of the image light the sensor holder 323 takes an attitude indicated by the solid lines in FIG. 13 in order to read image light 308a in the upper end portion of the screen 306 and takes an attitude indicated by the alternate long and two dashed lines in order to read image light 308b in the lower end portion of the screen 306. In this way the image light always vertically enters the line sensor 329. Note that substantially vertical incident image light alone is guided to the line sensor 329 through the slit 330 having the same width as the image light. When the image on the entire screen is completely read, the scan unit 320 again moves up, stops in the uppermost portion, and settles in the retracted state.

In this embodiment, since an image projected onto the screen is read on the back side of the screen, no special means for switching projecting optical paths is necessary. Also, no special retracting means is necessary because the scan unit can be retracted by using the moving means for read scan.

As described above, in this apparatus no image distortions occur even when the scan motor is rotated at a constant velocity during image read. Also, since the read state and the reader state are switched by using the mirror rocking mechanism for read scan, no special switching means is necessary.

In addition, since the apparatus includes the attitude control means for controlling the attitude of the rockable reading unit, the incident angle of image light to the reading means can be controlled.

The apparatus also includes the attitude control means for controlling the attitude of the reading unit in accordance with the scan of a projected image done by the scan unit. Consequently, it is possible to control a change in the incident angle of image light to the reading means during image scan.

Since the incident angle of image light to the reading means is so controlled as to be substantially constant, accurate image read is possible even with the use of an inexpensive reading means whose light receiving angle is small.

Furthermore, the reading unit is rockably provided in the scan unit and has the attitude control means consisting of the first guide member for guiding the movement in the scan direction of the scan unit, the second guide member having a predetermined inclination with respect to the scan direction, the rotating member provided on the shaft protruding from the arm of the reading unit, and the elastic member provided in the scan unit to bias the rotating member to make it abut against the second guide member. Consequently, it is possible to provide a highly reliable image reading apparatus with a simple inexpensive construction.

Also, the scan unit includes the optical path length correcting means which corrects the optical path length of image light entering the reading means by reflecting the light by using the rockable reflecting means. As a consequence, image distortions caused by a change in the optical path length can be prevented.

The optical path length correcting means includes the reading unit holding means which rectilinearly moves and the optical path length correcting cam for regulating the movement of the reading unit holding means. The reading unit attitude control means includes the reading unit and the attitude regulating cam for regulating the attitude of the reading unit. The optical path length correcting cam and the attitude regulating cam are coaxially arranged. Consequently, it is possible to prevent image distortions and provide a highly reliable image reading apparatus with a simple inexpensive construction.

Image scan is performed by rocking the first reflecting member for reflecting the image light of an original transmitted through the projecting lens. The image light reflected by the first reflecting member is reflected by the second reflecting member, so that the image optical axes cross each other, and the light is projected onto the screen. This increases the degree of freedom of the arrangement of the reflecting members and makes it possible to provide a small image reading apparatus with excellent operability.

The apparatus further includes the locking means for fixing the reading means in an arbitrary attitude with respect to the rockable reading unit. Therefore, even if the reading means has read accuracy variations in accordance with the light receiving angle, image degradation can be avoided by changing the incident angle of image light to the reading means.

Additionally, unnecessary light can be effectively shielded by the slit formed in the reading unit. This improves the image read accuracy and also increases the degree of freedom of the arrangement of the reading means. Consequently, an apparatus with a highly operable construction can be provided.

Moreover, in the image reading apparatus including the original projecting means, the scan unit consisting of the rockable reflecting member and the driving means for the reflecting member, and the reading unit having the reading means for reading a projected image, the driving means includes the scan rate correcting mechanism consisting of the first rotating member having a radially extending groove hole and the second rotating member having a protruding shaft which fits in and slidably moves along the groove hole. Accordingly, image distortions caused by variations in scan rate can be avoided with a simple inexpensive construction.

What is claimed is:

1. An image reading apparatus capable of being switched between an observation state in which an image on a recording medium is projected onto a screen and observed, and a read state in which the image is projected onto a reading unit and read, comprising:

a projecting lens a rockable first reflecting member for reflecting the image light from said projecting lens;

a second reflecting member provided in opposition to said screen to guide the image light reflected at said first reflecting member to said screen;

a third reflecting member for guiding the image light reflected at said first reflecting member to said reading unit, wherein said projecting lens and said third reflecting member are disposed on the same side of a projection optical path extending from said second reflecting member to said screen while said first reflecting member is disposed on the other side of the projection optical path; and means for rocking said first reflecting member so as to effect the switch between the observation state in which the image light from said projecting lens is reflected toward said second reflecting member and the read state in which the image light is reflected toward said third reflecting member.

2. An apparatus according to claim 1, further comprising moving means for moving said reading unit in accordance with the rocking motion of said first reflecting member.

3. An apparatus according to claim 2, wherein said moving means moves said reading unit in a direction of an optical axis.

4. An apparatus according to claim 2, wherein said moving means changes an attitude of said reading unit.

5. An apparatus according to claim 1, wherein said reading unit is arranged behind said second reflecting member.

6. An apparatus according to claim 5, wherein a reflecting surface of said first reflecting member points downward, and a reflecting surface of said third reflecting member points upward.

7. An apparatus according to claim 1, further comprising attitude control means for controlling an attitude of said reading unit.

8. An apparatus according to claim 7, wherein said attitude control means changes the attitude of said reading unit in accordance with the rocking motion of said first reflecting member.

9. An apparatus according to claim 7, wherein said attitude control means so performs control that an incident angle of the image light to said reading unit is substantially constant.

10. An apparatus according to claim 7, wherein said attitude control means moves said reading unit toward the optical axis direction of a projection optical path between said recording medium and said reading unit so as to vary the projection optical path length between the recording medium and said reading unit.

11. An apparatus according to claim 10, wherein said reading unit is moved in the optical axis direction in association with the rocking movement of said first reflecting member.

12. An apparatus according to claim 7, further comprising locking means for fixing said reading unit in an arbitrary attitude.

13. An apparatus according to claim 1, wherein said reading unit includes a line image sensor.

14. An apparatus according to claim 1, wherein said first reflecting member rotates about an optical axis, and switching between optical paths and scanning of an image on said reading unit are performed by the rotation.

15. An apparatus according to claim 1, further comprising connecting means for rocking said first reflecting member together with said reading unit.

16. An image reading apparatus capable of being switched between an observation state in which an image on a recording medium is projected onto a screen and observed, and a read state in which the image is projected onto a reading unit and read, comprising:

a projecting lens for projecting the image;

a plurality of reflecting members for guiding the image from said projecting lens to said screen and said reading unit, at least one of said reflecting members being rockable so as to effect the switch between the observation state and the read state and to scan the image; and means for changing an inclination angle of a reading surface of said reading unit in association with the rocking movement of said reflecting member.

17. An image projecting apparatus capable of being switched between an observation mode in which an image is projected onto a screen, and a read mode in which the image is projected onto an image sensor, comprising:

a projecting lens;

a first mirror for receiving light from said projecting lens;

a second mirror for guiding the light reflected at said first mirror to said screen;

a third mirror for guiding the light reflected at said first mirror to said image sensor, wherein said projecting lens and said third mirror are disposed on the same side of a path of light reflected by said second mirror while said first mirror is disposed on the other side of the path of light reflected by said second mirror; and means for moving said first mirror between a first position and a second position so as to effect the switch between the observation mode and the read mode, wherein when said first mirror is positioned at the first position the image is projected on said screen, and when said first mirror is positioned at the second position the image is projected onto said image sensor.

18. An apparatus according to claim 17, wherein said moving means moves said first mirror to a third position from the second position so as to effect the image scanning after said first mirror has been moved to said second position.

* * * * *

UNITED STATES PATENT AND TRADEMARK OFFICE
CERTIFICATE OF CORRECTION

PATENT NO. : 5,755,500
DATED : May 26, 1998
INVENTOR(S) : Matsumoto et al.

It is certified that error appears in the above-identified patent and that said Letters Patent is hereby corrected as shown below:

On the title page, item:

[56] REFERENCES CITED:

FOREIGN PATENT DOCUMENTS, "0578532    1/1982    Japan
                          389671    4/1991    Japan
                          4320210   11/1992   Japan" should
    read --57-8532     1/1982    Japan
           3-89671     4/1991    Japan
           4-320210    11/1992   Japan--.

COLUMN 4:

Line 64, "56 a" should read --56a--.
Line 66, "59a" should read --59a.-- and 56 a and 59 a"
   should read --56a and 59a--.

COLUMN 9:

Line 29, "lens" should read --lens;--.

Signed and Sealed this

Twenty-third Day of February, 1999

Attest:

Q. TODD DICKINSON

*Attesting Officer*    *Acting Commissioner of Patents and Trademarks*